United States Patent
Teal et al.

(10) Patent No.: US 7,309,274 B2
(45) Date of Patent: Dec. 18, 2007

(54) **IN-HIVE TRAP AND ATTRACTANT COMPOSITION FOR THE CONTROL OF THE SMALL HIVE BEETLE, *AETHINA TUMIDA***

(75) Inventors: Peter E. A. Teal, Gainesville, FL (US); Baldwyn Torto, Gainesville, FL (US); James H. Tumlinson, III, Julian, PA (US); Drion G. Boucias, Gainesville, FL (US)

(73) Assignees: The United States of America as represented by the Secretary of Agriculture, Washington, DC (US); University of Florida Research Foundation, Inc., Gainsville, FL (US)

( * ) Notice: Subject to any disclaimer, the term of this patent is extended or adjusted under 35 U.S.C. 154(b) by 422 days.

(21) Appl. No.: 11/088,499

(22) Filed: Mar. 1, 2005

(65) Prior Publication Data

US 2006/0141904 A1   Jun. 29, 2006

(51) Int. Cl.
A01K 47/06   (2006.01)
(52) U.S. Cl. .............................. 449/2; 449/26
(58) Field of Classification Search ............... 449/2, 449/3, 20, 22, 23, 26
See application file for complete search history.

(56) References Cited

U.S. PATENT DOCUMENTS

| | | | |
|---|---|---|---|
| 49,314 A * | 8/1865 | Starr | 449/23 |
| 144,847 A * | 11/1873 | Hough | 449/22 |
| 4,443,904 A | 4/1984 | van Muyden | |
| 5,348,511 A | 9/1994 | Gross et al. | |
| 6,468,129 B1 | 10/2002 | Griffith | |
| 6,702,645 B2 | 3/2004 | Vanderpool | |

OTHER PUBLICATIONS

Suazo, A., et al., "Response of the Small Hive Beetle (*Aethina tumida*) to honey bee (*Apis mellifera*) and Beehive-Produced Volatiles", *Apidologie*, vol. 34, pp. 525-533, 2003.
Somerville, D., "Studay of the Small Hive Beetle in the USA", *RIRDC*, Public. No. 03/050, pp. ii-xii, Jun. 2003.
Defra, "The Small Hive Beetle A Serious new threat to European apiculture", pp. 1-16, 2003.
"Varroa & Small Hive Beetle Control", *CheckMite Catalogue*, p. 32, 2004.
"Bee Health Aids", GardStar, *Man Lake Limited Catalogue*, p. 34, 2004.
Clemson Univeristy, "Small Hive Beetle", *The Clemson University Cooperative Extension Service*, pp. Sep. 1999.
Fell, R.D., "The Small Hive Beetle A New Pest of Honey Bee Colonies", *Dept. of Entomology*, Jan. 1999.

(Continued)

*Primary Examiner*—Rob Swiatek
(74) *Attorney, Agent, or Firm*—John D. Fado; Gail E. Poulos

(57) ABSTRACT

A Small Hive Beetle trap, which replaces the bottom board of beehives, includes a frame having three walls and a top surface, a trap plate, an entry device, and a trapping means. The trapping device provides a dark environment attractive to small hive beetles and contains a small hive beetle attractant made from pollen dough and inoculated with yeast that produces small hive beetle attracting volatiles.

20 Claims, 5 Drawing Sheets

OTHER PUBLICATIONS

Fletcher, M.J., et al., "Small Hive Beetle", *NSW Agriculure*, DAI-288, Nov. 2002.

*CheckMite Bee Hive Pest Control Strip*, labeling, pp. 54-57, Expires Feb. 2004.

Small Hive Beetle Research Study Notes, pp. 1-34.

Sanford, M.T., "Small Hive Beetle", *Univ. Of Florida IFAS Extension*, p. 1-6.

Hood, Wm M., et al., *Published Scientific Notes on the Small Hive Beetle Provided to the Australian Study Group*, pp. 35-53.

Ellis, J., et al., "Efficacy of Modified Hive Entrances and a Bottom Screen Device for Controlling *Aethina tumida* (Coleoptera: Nitidulidae) Infestations in *Apis mellifera* (Hymenoptera: Apidae) Colonies", Apiculture and Social Insects, *J. Econ. Entomol.*, vol. 96, (6), pp. 1647-1652, 2003.

*Dadant Beekeeping Catalog*, M01540 Small Hive Beetle Trap, Added to catalog Mar. 2004.

\* cited by examiner

IN-HIVE TRAP AND ATTRACTANT COMPOSITION FOR THE CONTROL OF THE SMALL HIVE BEETLE, *AETHINA TUMIDA*

BACKGROUND OF THE INVENTION

1. Field of the Invention

This invention relates to a Beehive System that includes a small hive beetle trap and to a lure for capturing small hive beetles found in honeybee hives. It also relates to methods for using the system, the trap, and the lure.

2. Description of the Related Art

Apiculture is a vital component of modern agriculture. Currently there are more then 2.5 million honeybee producing colonies in the United States with an estimated value of the beekeeping and pollination industries of about 14.6 billion dollars per year. Honeybees, specifically *Apis mellifera* L., are highly efficient foragers on numerous flowering plants, including agricultural crops. Plant pollination by the honeybee is the most commonly recognized means of crop pollination. Beekeepers are challenged with diseases and pests within hives such as the tracheal and varroa mites in the United States and destructive diseases such as foulbrood disease. A beehive generally has a fixed top and bottom and includes an exclusion device to keep the queen bee isolated. The bottom board is generally a rectangular shaped box or frame upon which the rest of the beehive is stacked. The bottom board includes a gap on or in one of the four upstanding walls through which bees enter and exit the beehive while keeping out other larger insects, mice, and other rodents.

The small hive beetle is an exotic pest that originates from South Africa and was found in Florida in 1998. It has now spread throughout the eastern and mid-western United States, causing considerable damage to honey bee colonies and negatively impacting the beekeeping industry (Morse and Calderone, Bee Culture, Volume 128, 1-15, 2000). In sub-Saharan Africa, the beetle's native home, they are not considered a major pest of honey bees (Lundie, Sci. Bull. 220, Union of South Africa, Department of Agriculture and Forestry, 30 pages, 1940), because in strong colonies, worker honey bees encapsulate groups of small hive beetles with propolis (Neumann et al., Naturwissenschaften, Volume 88, 2140216, 200). However in the United States, where honey bee colonies are predominantly of European origin, small hive beetles have been reported to damage both weak and strong colonies (Sanford, Apis, Volume 16, 1-5, 1998). Defense mechanisms have yet to be demonstrated in European bees.

Damage to honey bee colonies in the United States is caused mainly by the beetle larvae, which feed on honey, pollen, and brood. In addition, larval excrement tends to ferment honey, rendering it unsuitable for human consumption. In highly infested colonies, where larval feeding is extensive, bees generally leave. The beetle can multiply to huge numbers within infested colonies where it eats brood, destroys combs, and if uncontrolled ultimately destroys the hives. If the infestation is sufficiently heavy, the beetles may cause bees to abandon their hive. In stored combs and honey awaiting extraction, the beetle larvae may tunnel through the combs of honey, feeding and defecating, causing discoloration and fermentation of the honey. The small hive beetle will thrive in tropical, semi-tropical and temperate climates. It is an opportunist and a scavenger, taking advantage of situations that suit its reproduction. Adult beetles lay eggs in irregular masses in crevices or brood combs containing pollen or brood. Each female beetle is capable of laying an enormous number of eggs which can lead to a heavy infestation in a single generation. Beetle larvae mature from egg to pupae in about 10-16 days. The larvae require a diet of honey and pollen to fully develop. Beetle larvae also feed on stored comb and supers of honey in honey houses, especially frames containing pollen. The beetle is a major problem when honey supers are allowed to remain in the bee hive for long periods prior to extraction. Wax cappings, set aside following honey extraction, may also become beetle infested. Bee brood rearing stops when beetle infestation reaches high levels in the colony.

Currently small hive beetles are controlled using good management and a number of techniques that can reduce the impact of the beetle. Relocating hives may break the beetle's life cycle. Pesticide containing products such as Check-Mite+™ strips and GardStar® (MannLake Ltd., Hackensack, Minn.) have been recommended for hive beetle control. The CheckMite+™ is an inside-hive treatment while the GardStar® is a soil drench.

U.S. Pat. No. 6,468,129 (Griffith, Oct. 22, 2002) discloses a bottom board that has a screen permanently installed in the bottom board that covers the full expanse between the upstanding walls so that mites in the hive have to pass through the screen and come in contact with a sub-board that is removable from the bottom board through a rear access. The subboard may optionally include a sticky coating to trap the mites that pass through the screen.

U.S. Pat. No. 4,682,380 (Martin, Jul. 28, 1987) discloses a bottom board which is flat at its base with three upstanding walls to support the remainder of the beehive with a gap provided between two of the upstanding walls to allow bees to enter and exit the hive.

Suazo et al., (Apidologie, Volume 34, 525-533, 2003) report that there has been no attempt to identify the cues attracting small hive beetles to honey bee hives. They state that Elzen et al. (Apidologie, Volume 31, 361-366, 1999) reported that small hive beetles are attracted to a combination of honey, pollen, and adult bees. They also reported that small numbers of beetles were captured in traps baited with adult bees but not in traps baited with honey and pollen, or brood alone.

Various forms of small hive beetle control are known, however there remains a need in the art for reliable control methods and traps for controlling small hive beetles. The present invention, as described below, is different from related art control methods, lures, and traps.

SUMMARY OF THE INVENTION

It is therefore an object of the present invention to provide a trap, and attractant for controlling small hive beetles in beehives.

Another object of the present invention is to provide a trap for a beehive that includes a frame having three walls and a top surface wherein an interior of two of said walls includes a means for supporting a trap plate, a trap plate, at least one entry means, and a trapping means.

A further object of the present invention is to provide a trap for a beehive wherein the top surface of the frame has an opening covered with a mesh screen which allows insects the size of a small hive beetle and its larvae to drop through towards the entry means and excludes honeybees from exiting the hive through the screen.

A still further object of the present invention is to provide a trap for a beehive wherein at least one entry means includes a plurality of graduated tunnel-shaped entries having openings at either end wherein a proximal opening is larger than a distal opening.

Another object of the present invention is to provide a trap for a beehive wherein the proximal opening of the entry means is of a size to allow an insect the size of a small hive beetle and its larvae to crawl in and the distal opening is of a size to prevent an insect the size of a small hive beetle and its larvae from crawling back out of the trapping means.

A further object of the present invention is to provide a trap for a beehive wherein the trapping means has a removable top which is attached to the trap plate using a rubber gasket.

A still further object of the present invention is to provide a trap for a beehive wherein the trapping means includes an attractant.

Another object of the present invention is to provide an attractant for small hive beetles that includes pollen and beetle vectored yeast wherein the attractant is fermented in the presence of moisture until it releases small hive beetle attracting volatiles.

A still further object of the present invention is to provide an attractant wherein the pollen is natural pollen, a pollen substitute, or a mixture of the two.

A still further object of the present invention is to provide an attractant that includes pollen and yeast strain NRRL Y-30722.

Another object of the present invention is to provide yeast strain NRRL-3722.

Further objects and advantages of the present invention will become apparent from the following description.

DEPOSIT OF THE MICROORGANISMS

*Yeast* sp. NRRL Y-27634 has been deposited under the provisions of the Budapest Treaty on Mar. 15, 2004 with the U.S.D.A. Agricultural Research Service Patent Culture Collection (National Center for Agricultural Utilization Research, 1815 N. University Street, Peoria, Ill. 61604).

BRIEF DESCRIPTION OF THE DRAWINGS

FIG. 2 is a drawing showing the top view of trap 10 showing trap top 24 with frame 22, and center opening 25 with mesh screen 25a.

FIG. 4a shows top of trap plate 26 including trap plate opening 27 and entry means 30 and FIG. 4b shows the container portion of trapping means 28 which in this figure is the bottom portion of a Tupperware egg tray.

DETAILED DESCRIPTION OF THE INVENTION

Figure 1:
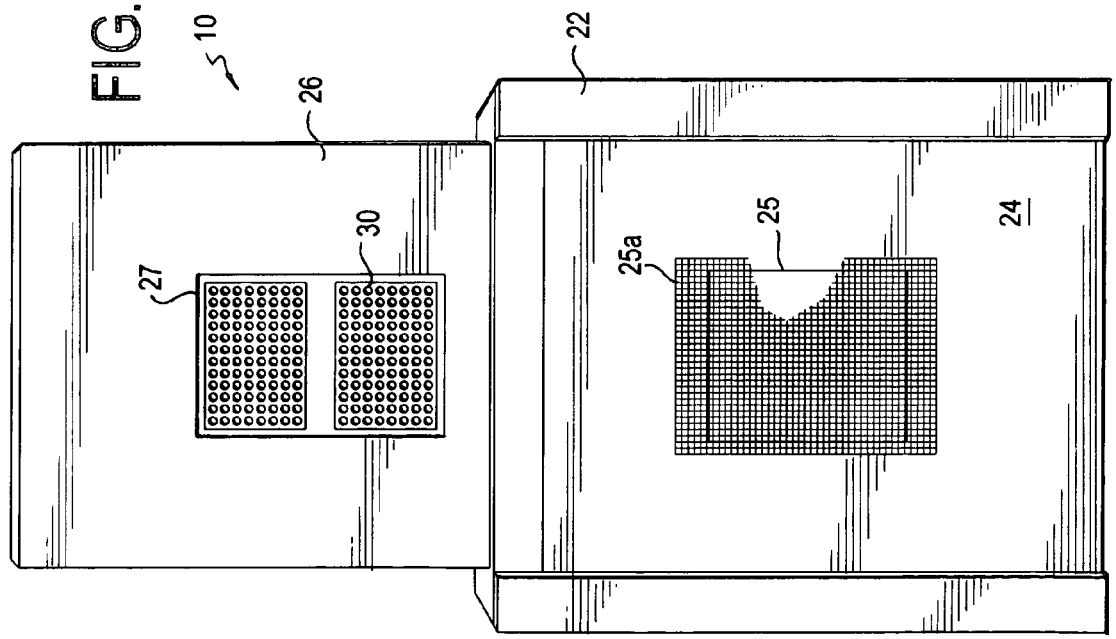
FIG. 1 is a drawing showing a top view of trap 10 showing trap top 24 and trap plate 26 including frame 22, mesh screen 25a, center opening 25, trap plate opening 27 and entry means 30.
Figure 5:
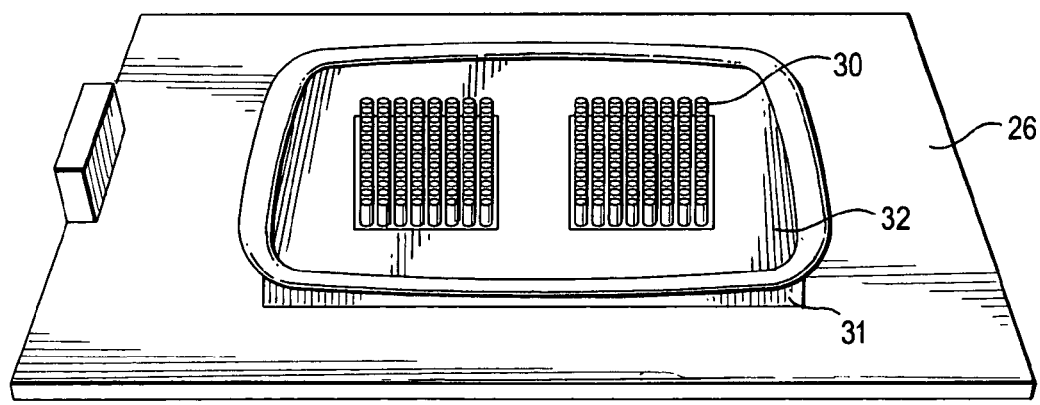
FIG. 5 is a drawing showing the bottom view of tray plate 26 with rubber gasket 31, entry means 30, and cover for trapping means 32.

It is desirable to provide a beehive structure that eliminates or at least reduces the incidence and effects of small hive beetle infestation. The present invention, Trap 10, is employed as an isolation or separation device for small hive beetles infesting beehives. Trap 10 is shown in FIGS. 1-5. Trap 10 includes frame 22, top 24, trap plate 26, and trapping means 28 (FIGS. 1 and 4b). Frame 22 is constructed to fit the external measurements of a wooden beehive. The beehive is placed on top of trap 10. Trap 10 is the bottom board of the hive. Trap 10 includes frame 22 which is made up of a front wall 23 and two side walls 21; each approximately 2 inches in width (FIG. 3). Side walls 21 have on their inside surface, means 29 for removably supporting trap plate 26. Means 29 can be supports attached to the interior surface of side walls 21. Means 29 can also be slots formed in the interior surface of walls 21 and run the entire length of each of walls 21. Trap plate 26 has an opening 27 which can be of any size and is preferably rectangular in shape. Attached permanently or removably to the underside of plate 26, covering opening 27, is entry means 30 which allow beetles and larvae to enter trapping means 28, but not to exit (FIGS. 4a and 5). Means 30 has a plurality of graduated tunnel-shaped entries having two openings at either end wherein the proximal opening is larger than the distal opening. The distal opening facing trapping means 28 is large enough for a small hive beetle or larvae to crawl through and drop into trapping means 28 but the distal opening is also small enough so that the insects cannot enter and return to the hive.

In one embodiment of the present invention (FIGS. 1-5), entry means 30 is at least one PCR 96-well plate having conical-shaped wells (FIGS. 3 and 5). The bottom tips of the wells are snipped off to form about a ⅛ inch opening in each well for the beetles and larvae to pass through to enter trapping means 28. The bottom openings of the plate are of a size to allow the beetles and larvae to squeeze through to enter trapping means 28 but small enough that they cannot exit out of means 28.

Trapping means 28 is removably attached to the underside of trap plate 26 (FIGS. 4b and 5). Trapping means 28 can be any container with 4 side walls, a base, and a removable top 32 that is attached to trap plate 26 so that beetles and larvae cannot escape from means 28 by crawling between means 28 and trap plate 26. The top of trapping means 28 is attached to trap plate 26 using a rubber gasket 31 to seal all edges so that beetles and/or larvae cannot escape. The removable cover facilitates the replacement of bait and the removal of insects. Attachment of means 28 is well within the ordinary skill in the art. Minimum height of side walls of means 28 is at least about 4 inches. Trapping means 28 is opaque to provide a dark environment that is attractive to small hive beetles. In one embodiment of the present invention, trapping means 28 is an egg plastic storage container having a removable cover, such as sold by Tupperware. The container is painted black to provide an opaque trapping means. The removable top 32 for the egg plastic storage container 28 is permanently affixed to bottom 26a of trap plate 26 using adhesive and rubber gasket 31 allowing the container to be removable to-replenish the bait and remove the trapped insects. The removable top 32 of the container has at least one opening 33 so that the insects can drop into the means 28 after crawling through the entry means 30. The at least one opening 33 in the cover coincides in shape and size to that of entry means 30. Holes can be drilled into the bottom of means 28 at its shorter sides allow for drainage of rain water which can flood the means 28 and destroy the attractant.

Figure 2:
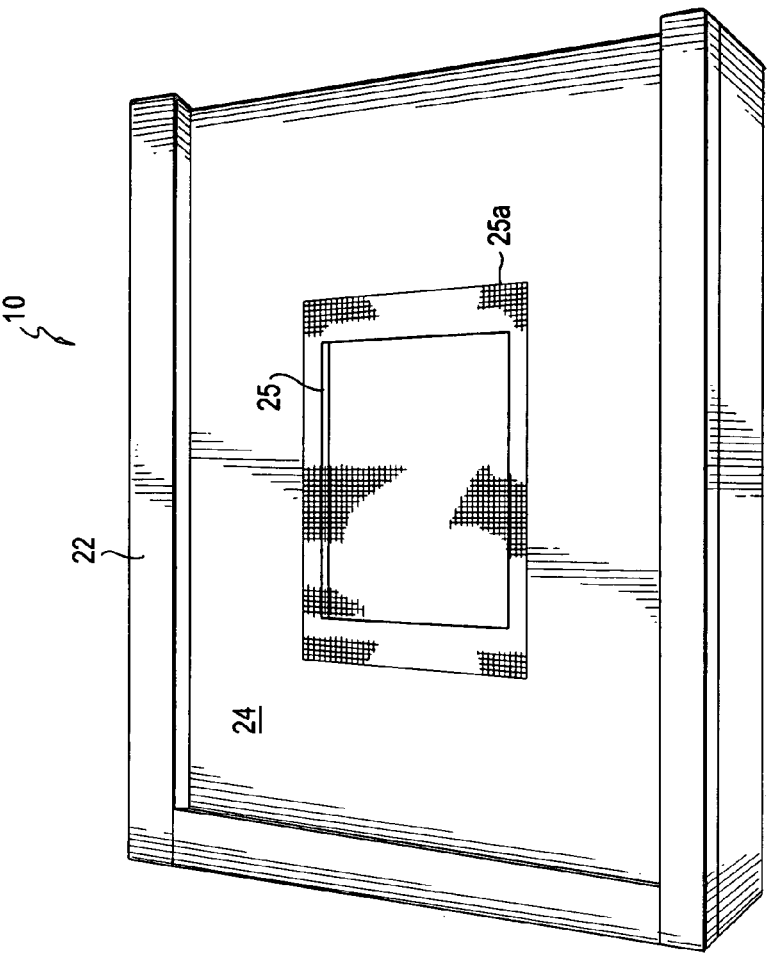
Figure 3:
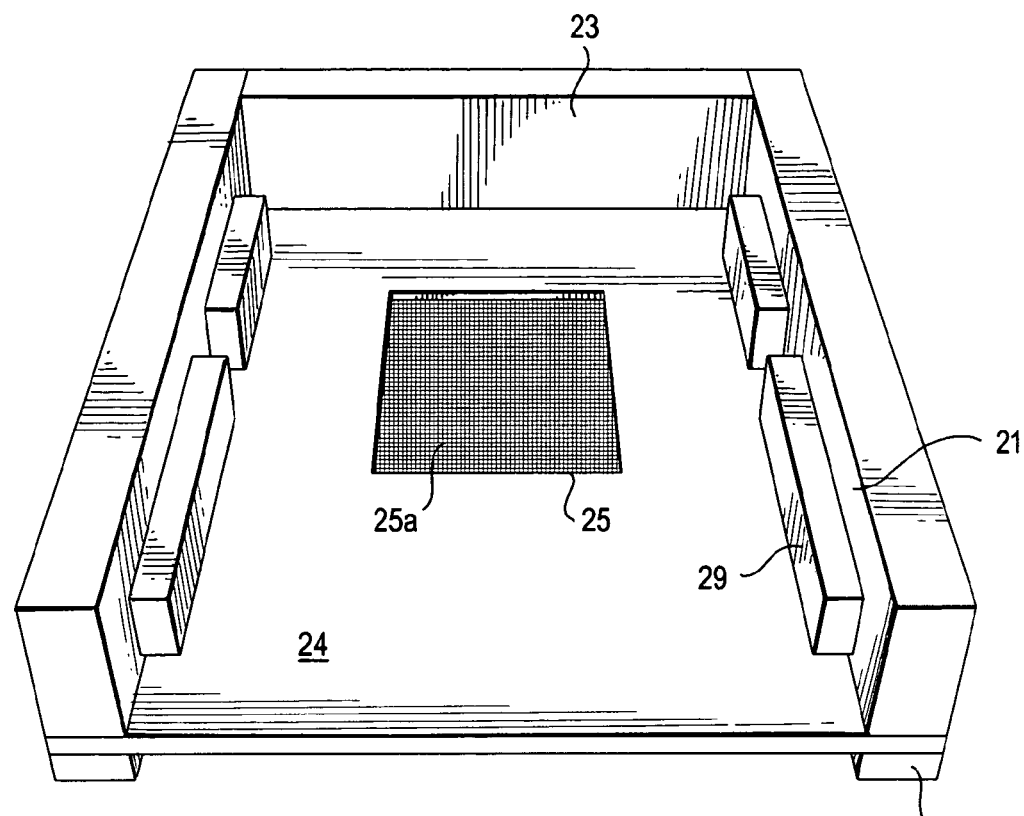
FIG. 3 is a drawing showing the bottom view of frame 22 including side walls 21, front wall 23, top 24, center opening 25 with mesh screen 25a, and means for removably supporting trap plate 29.
Figure 4B:
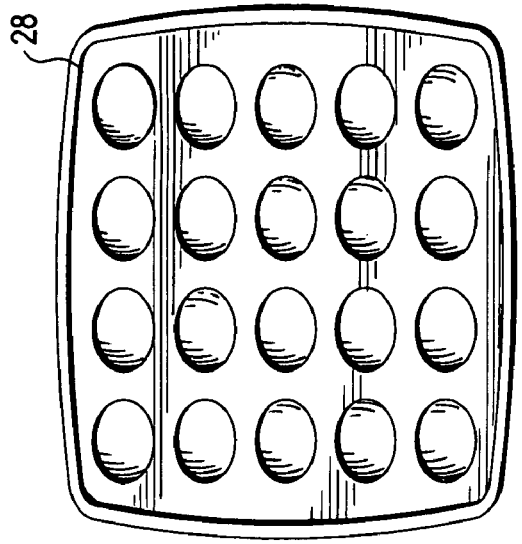
FIGS. 4a and 4b are drawings.
Figure 4A:
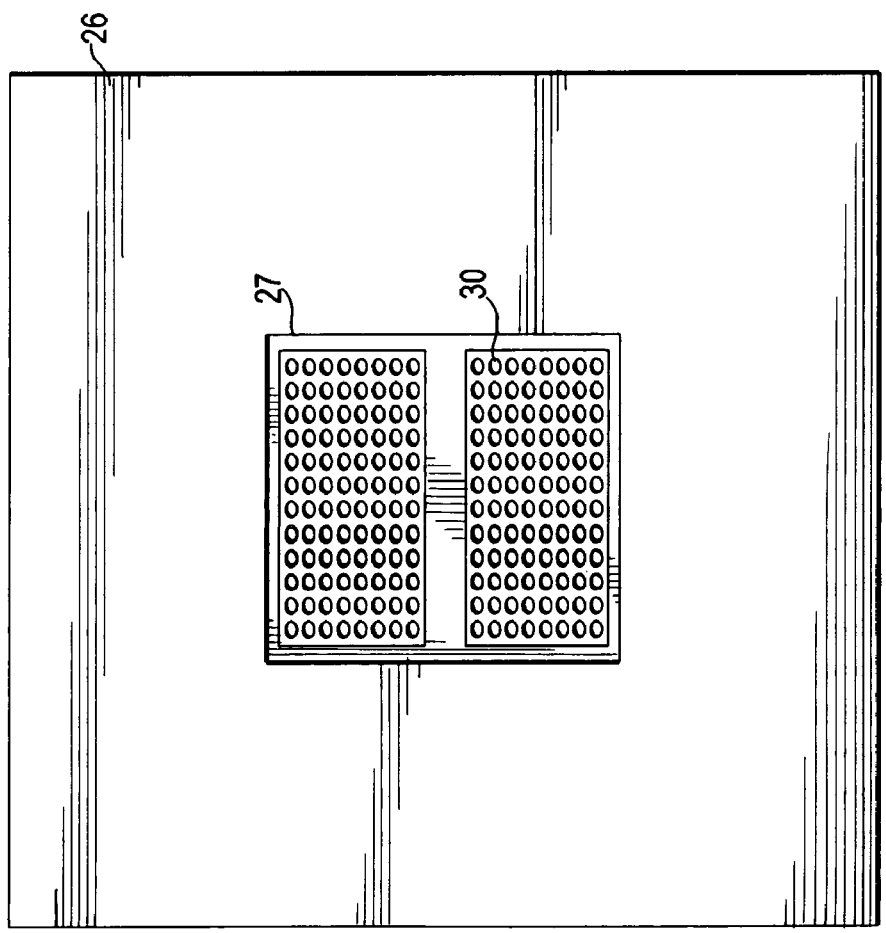

Affixed to frame 22 is a top 24 (FIGS. 1-3). Top 24 is sized to be flush with the outer edges of frame 22 and is affixed using any means within the ordinary skill in the art, such as for example, nails, screws, adhesive, staples, clips, etc. Top 24 has a center opening 25 which can be of any size or shape and equal in dimension to opening 27 in trap plate. It is preferred that the opening be rectangular in shape. Opening 25 is covered with mesh screen material 25a which has a mesh size that allows small hive beetles to drop through but does not allow honeybees to exit the hive through the screen. Mesh screen 25a can be of any material with ⅛ inch nylon mesh screen is preferred.

The small hive beetle lure or attractant of the present invention is made up of a cake of moist pollen dough upon which male or female or larvae of beetles have fed for three days. This results in natural inoculation of the pollen dough with beetle vectored fungus. Fermentation of the pollen dough over time results in release of volatile chemicals that attract the small hive beetles. The dough is made by combining either natural pollen and/or commercially available pollen substitutes such as, for example, Bee-Pro® (Mannlake Bee Supplies, Hackensack, Minn.), with honey or corn syrup in approximately a 1:3 ratio by weight. Moisture in the pollen dough is provided by damp cotton balls/wicks placed randomly into the container holding the dough.

In another embodiment of the invention, the pollen dough is prepared by mixing the pollen as described above with about 3 ml of novel yeast species strain Y-27634, NRRL Y-30722 in water, deposited under the Budapest Treaty. The ratio of pollen to yeast is about $10^6$ cells of yeast per gram of pollen dough prior to the three day incubation period before placing in traps. Mixing is accomplished by applying the aqueous suspension of yeast to the surface of the pollen.

Strain Y27634 was isolated from small hive beetle larvae and adult insects. The beetles were removed from an infested hive and surface sterilized with about 70% ethanol for about 30 seconds. The insects were then rinsed twice with sterile water. The beetles were then homogenized in sterile water to form a suspension. The suspension was streaked onto Sabouraud dextrose agar plus 1% yeast extract (SDAY). Honey samples were also collected from the infested hive and plated for isolation on SDAY. Inoculated plates were incubated at about 31° C. for approximately 1-3 days. Individual colonies were selected and sub-cultured on SDAY. Isolates were inoculated into Durham tubes containing autoclaved bee pollen broth tubes and incubated at about 31° C. for approximately 5 days. Bee pollen broth is about a 1% aqueous suspension of bee pollen. The gas-producing larval isolate NRRL Y27634 produced a colony morphology characteristic of the majority of yeast colonies observed in the initial isolation. The yeast isolate was plated on pollen agar (about 1% pollen plus 1.5% agar), Lee's agar, Czapek-Dox broth, M40Y agar (a high sucrose, osmotic-stress medium), and moistened sterilized pollen. Inoculated plates were incubated at about 28° C. for about 7-10 days.

In operation, fermentation of either embodiment of the lure results in the release of volatile chemicals including: acetaldehyde, ethanol, ethyl acetate, 2-methyl-1-propanol, 3-methyl-1-butanol, 2-methyl-1-butanol, 3-methyl-1-butanol acetate, 2-heptanone, hexyl acetate, octanal, nonanal, decanal, methyl benzoate, and related straight chain and branched chain saturated alcohols and their esters which are highly attractive to small hive beetles. Furthermore, trapping means 28 is opaque and provides a dark environment that is attractive to small hive beetles and beetle larvae. Beetles move through screen 25a and drop onto and into entry means 30 and traverse through the conical-shaped entries finally dropping into trapping means 28 which contains the pollen dough containing the attractive yeast. Once in trapping means 28, beetles remain because of the conical nature of the holes of entry means 30, and the illuminated contrast provided by the opaque trapping means 28. These conditions do not allow the beetles and larvae to escape back into the beehive. Additionally, the pollen dough serves as food for the beetles and larvae and as an egg laying trap for females. Emerging larvae continue to feed on the pollen dough and then move out into the moist cotton balls where they attempt to pupate. Thus, all eggs, larvae, pupae, and adult beetles remain in the trap and can not escape back into the hive. Females can lay many hundreds of eggs so eliminating a single female eliminates large numbers of beetle larvae from a hive. Trapping means 28 is cleaned by removing the container portion and disposing of the insects. The insects in the trap can be killed by placing the insects in a container such as a bucket filled with soapy water, or the pollen dough can contain at least one insect growth regulator, conventional toxicant such as coumaphos for example, natural anti-insect agents applied in a carrier with or without additives such as surfactants including glycerol, Tween 20®, etc.

The following examples illustrate the use of the invention. They are intended to further illustrate the invention and are not intended to limit the scope of the invention as defined by the claims.

EXAMPLE 1

The Small Hive Beetle attractant of the present invention was prepared by mixing about 70 grams of powdered pollen made by grinding pollen grains in a household blender, about 560 grams of the commercial pollen substitute BeePro® (MannLake, supra) in about a 1:8 ratio of powdered pollen: pollen substitute, and about 1 liter honey. To prepare the lure, the honey is warmed to about 60° C. After warming, the powdered pollen and pollen substitute were gradually added to the honey while stirring to obtain pollen dough. The dough was then allowed to cool to room temperature. The dough was then moistened with about 100 ml of distilled water through a wick suspended form a vial inserted into the dough. Approximately 300 adult beetles, preferably males or virgin females, were introduced into the dough to feed and to inoculate it with their yeast cells. The container is covered with plastic wrap or aluminum foil held in place by a rubber band and several pin holes are punched in the top. The container is left at room temperature for at least 3 days. Mated females can also inoculate the dough but they tend to lay eggs in the dough. Yeast-inoculated dough from mated females has to be frozen for a time sufficient to kill any eggs that they may lay which is usually about 3-4 hours. The frozen dough must be thawed prior to use. After about 3-7 days of feeding, the lure becomes inoculated and is ready for use in a trapping system for trapping small hive beetles. The lure can be stored at least about −20° if not used immediately.

EXAMPLE 2

Attractive activity of the lure of the present invention was tested in a horizontal dual choice wind-tunnel (about 1.85×0.66×0.66 M) according to the procedure described in Suazo et al (Apidologie, Volume 34, 525-533, 2003; herein incorporated by reference in its entirety) and Torto et al. (Apidologie, 2004; submitted). Wind speed was set at about 0.2 m/s inside the wind tunnel. Two 34-watt fluorescent tubes about 4 feet long were placed about 0.2 m above the wind-tunnel to provide illumination. Temperature in the bioassay room was maintained at about 27° C., with a relative humidity of about 40-60%. Tests were carried out between 6 pm and midnight, when beetle flight activity was at its peak. Odor sources were about 9 grams of the lure, as described above in Example 1, and a similar weight of the pollen dough without the yeast. Each was placed in a 2 liter glass jar outside the wind-tunnel.

A stream of purified air is passed through each chamber at a flow rate of about 0.5 L/minute downwind from the odor source. Responding beetles were captured in traps made out of plastic vials (25 dram, BioQuip, Gardena, Calif.), fitted with a screen cone with about a 5 mm opening. This opening allowed beetles to enter the vial but not exit. Tests were replicated three times and beetles were used only once and then discarded. For each replicate the number of beetles responding was recorded for about 15 minutes. The position of odor sources was switched between replicates to minimize positional bias. Beetles were deprived of food and water for one day prior to bioassays.

Figure 6A:
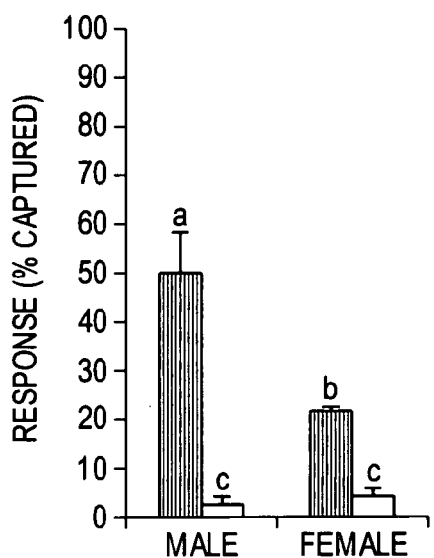
FIGS. 6A and 6B are graphs showing wind tunnel responses of different sexes of the small hive beetle to volatiles released from the lure fed on by (4A) 100 males, 4-8 weeks old; and (4B) 100 females, 4-8 weeks old compared to control (n=3 replicates, N=25 beetles/replicate). Bars with different letters are statistically significant (P<0.05, LSD test).
Figure 6B:
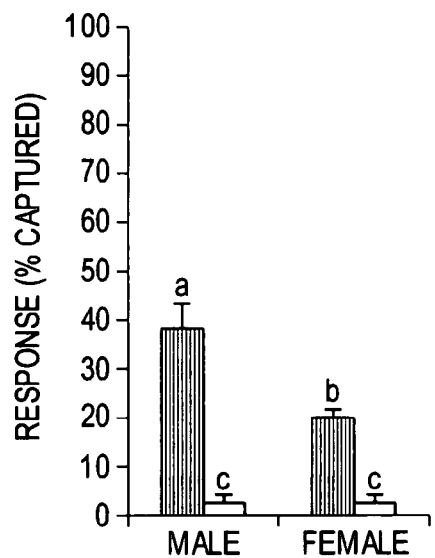

Results presented in FIGS. 6A and 6B clearly show that significantly more small hive beetles were lured into traps releasing volatiles from the lure—71% males, 31% females—than to control traps 5% males, 6% females.

EXAMPLE 3

Figure 7:
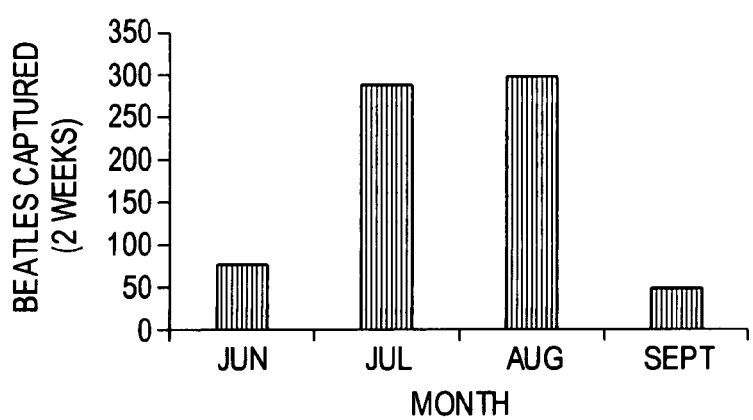
FIG. 7 is a graph showing the number of beetles trapped between June and September at a beeyard in High Springs, North Central Florida.
Figure 8:
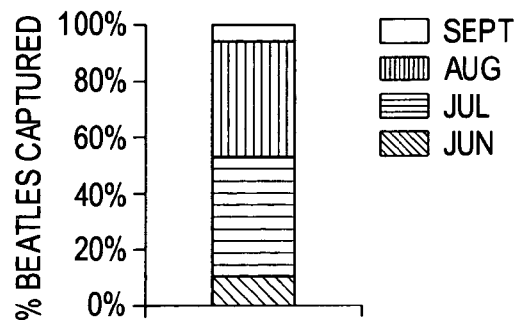
FIG. 8 is a graph showing the percentage of small hive beetles trapped between June and September at a beeyard in High Springs, North Central Florida.

The lure described above in Example 1 was tested in a PVC pipe trap (about 34 cm long×9 cm OD) at a beeyard (about 30 m long×30 m wide) in High Springs, North Central Florida in the summer. The beeyard had 35 mating nucs mounted on a wooden platform about 30 cm for the ground, and 4 double storey full hives arranged in a semi-circle at the edge of cleared field surrounded by pine and oak trees. Baited and unbaited traps were tested. The baited trap consisted of the PVC pipe trap containing about 50 grams of the moistened lure, with the unbaited trap laced with moisture only. Moisture was released into the trap through a braided cotton wick (Richmond Dental, Charlotte, N.C.) fitted through about a 0.5 cm hole in the cap of two plastic capped vials (BioQuip, supra) each filled with about 15 ml of distilled water. Baited and unbaited traps were hung on a T-shaped pole of about 1.5×1.5 m in the woods, with poles distributed around the hives to fit the semi-circular pattern of the hives with six replicates. Intertrap distance on a pole was about 1 meter, while interpole and the distance of the poles from the hives were all about 7.5 m. Traps were set up at 4:00 pm in the afternoon and the number of beetles trapped was checked every 3-4 days at about 11:00 am. The lure was replaced every 14 days. Results in FIG. 7 clearly show that the lure is effective as a tool for monitoring small hive beetle populations. The results also show that over 80% of the small hive beetles were captured between July and August (FIG. 8). The small hive beetle male-female ratio in the traps was approximately 1-1.5:1 during the test period, showing that the lure is effective in trapping both sexes of the beetle.

EXAMPLE 4

Figure 9:
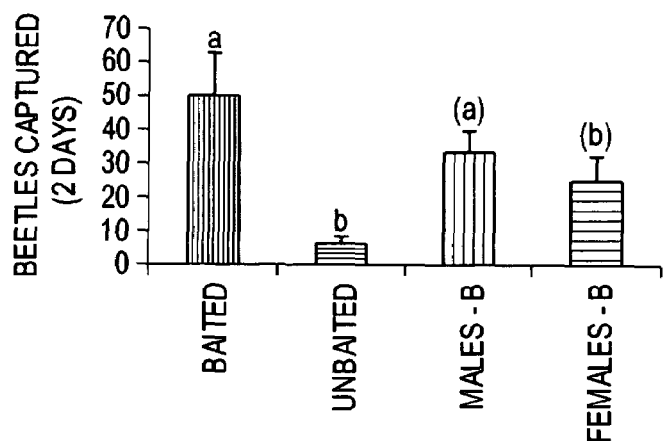
FIG. 9 is a graph showing the effect of baited and unbaited in-hive traps on small beetle captures at a beeyard in High Springs, North Central Florida. Males-B, Females-B=males and females captures in baited traps. Bars with different letters are statistically significant (P<0.05, LSD test).
Figure 10:
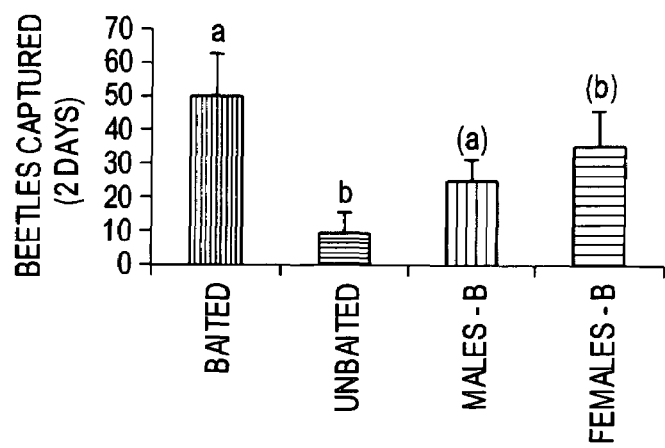
FIG. 10 is a graph showing effect of baited and unbaited in-hive traps on small hive beetle captures after switching traps attached to hives at the beeyard in High Springs, North Central Florida during the summer. Males-B, Females-B=males and females captured in baited traps. Bars with different letters are statistically significant (P<0.05, LSD test).

Lure activity was tested in combination with the In-Hive trap of the present invention at the same beeyard as in Example 2 in a September-October period for about 27 days. Trap captures of beetles from five baited and unbaited (control) traps were compared. The baited trap contained approximately 50 grams of moistened lure as described above in Example 1, while the unbaited trap was laced with moisture which was provided in both traps by six wet cotton balls. The number of beetles trapped every other day was recorded. On about day 17, the baited and unbaited traps were switched on the hives and hive captures were similarly recorded for a further 10 days. Trap captures for the baited and unbaited traps were pooled separately every other day to compute for the percentage of beetles captured (p). The data were transformed to arcsin $\sqrt{p}$, before differences among means were tested for significance by ANOVA with SAS Version 8.0. Captures of the small hive beetle in the traps were significantly different, and were higher by about 7-fold in the baited traps than captures in unbaited traps (FIGS. 9 and 10). Trap captures of males and females in the baited traps before and after switching traps showed no significant difference, confirming results obtained above in the experiment with hanging traps (Example 2 above) that the lure is effective in attracting both sexes of the beetle.

EXAMPLE 5

Strain Y27634 was isolated from small hive beetle larvae and adult insects. The beetles were removed from an infested hive and surface sterilized with about 70% ethanol for about 30 seconds. The insects were then rinsed twice with sterile water. The beetles were then homogenized in sterile water to form a suspension. The suspension was streaked onto Sabouraud dextrose agar plus 1% yeast extract (SDAY). Honey samples were also collected from the infested hive and plated for isolation on SDAY. Inoculated plates were incubated at about 31° C. for approximately 1-3 days. Individual colonies were selected and sub-cultured on SDAY. Isolates were inoculated into Durham tubes containing autoclaved bee pollen broth tubes and incubated at about 31° C. for approximately 5 days. Bee pollen broth is about a 1% aqueous suspension of bee pollen. The cultures were subcultured and volatile chemicals collected and tested for attractant qualities. The volatiles were tested with beetles in bioassays. NRRL Y27634 was the only colony which produced attractive volatiles. The gas-producing larval isolate NRRL Y27634 produced a colony morphology characteristic of the majority of yeast colonies observed in the initial isolation. The yeast isolate was plated on pollen agar (about 1% pollen plus 1.5% agar), Lee's agar, Czapek-Dox broth, M40Y agar (a high sucrose, osmotic-stress medium), and moistened sterilized pollen. Inoculated plates were incubated at about 28° C. for about 7-10 days.

EXAMPLE 6

Pollen dough was prepared from pollen collected by bees. About 9 grams of freshly collected pollen obtained from pollen traps at the entrance of a hive was autoclaved to produce sterile pollen. It was then inoculated with about $10^6$ cells of yeast strain NRRL Y-27634 per gram of pollen. The yeast was added to the sterilized pollen as a suspension in about 3 ml of water. This mixture is incubated at about 31° C. for about 3-5 days or until there is a noticeable fruity odor. About 3 ml of honey is added after the incubation period since the honey will prevent yeast growth if added prior to incubation.

Figure 11:
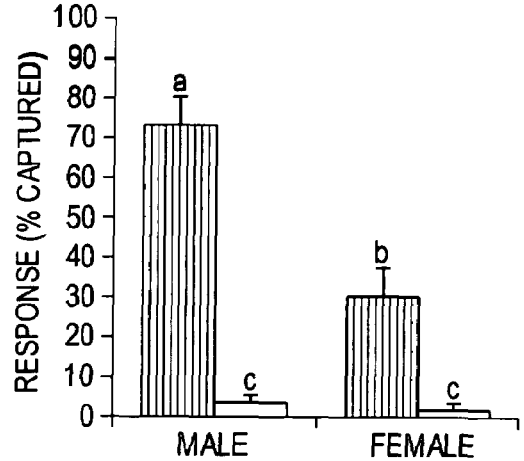
FIG. 11 is a graph showing wind tunnel responses of different sexes of small hive beetles to volatiles released from the lure compared to control (n=3 replicates, N=25 beetles/replicate). Bars with different letters are statistically significant (P<0.05, LSD test).

Attractive activity of the lure was tested in a horizontal dual choice wind-tunnel of about 1.85×0.66×0.66 m as described above in Example 2. Wind speed was set at about 0.2 m/second inside the wind tunnel. Two 34-Watt fluorescent tubes about 4 feet long were placed about 2 meters above the wind-tunnel to provide illumination. Temperature in the bioassay room was maintained at about 27° C., with relative humidity at about 40-60%. Tests were carried out between 19:00 and 24:00 hours when beetle activity was at its peak. Odor sources were about 9 grams of the lure and a similar weight without the active components, each placed in a 2 liter glass jar outside the wind-tunnel. A stream of purified air was passed through each chamber at a flow rate of approximately 0.5 liters/minute. Twenty five adult male or female small hive beetles of about 4-8 weeks in age were released simultaneously from a plastic holding vial (25 dram, BioQuip, Gardena, Calif.), about 1.5 meters downwind from the odor source. Responding beetles were captured in traps made out of plastic vials (25 dram, BioQuip, supra) fitted with a screen cone with about a 5 mm opening. This opening allowed the beetles to enter the vial but not exit. Tests were replicated three times and beetles were used only once. For each replicate, the number of beetles responding was recorded for about 15 minutes. The position of odor sources was switched between replicates to minimize positional bias. Beetles were deprived of food and water for one day prior to bioassays. Results are shown in FIG. 11. FIG. 11 clearly shows that significantly more small hive beetles were lured into traps releasing volatiles from the lure with about 73% males and 31% females captured compared to control traps which capture about 5% males and about 6% females.

EXAMPLE 7

Figure 12:
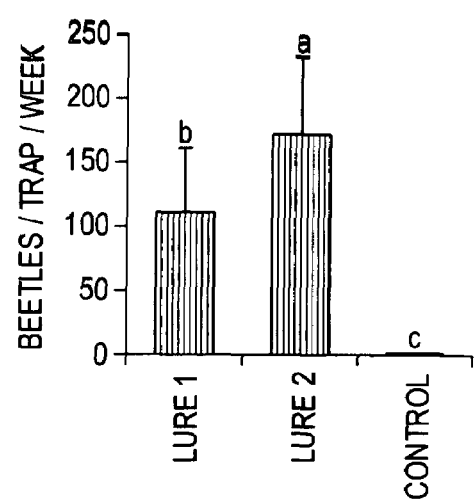
FIG. 12 is a graph showing the effect of different lures on trap capture of the small hive beetle. Lure 1 has 50 grams of lure inoculated by feeding males; Lure 2 has 9 grams of lure inoculated with NRRL Y-27634; control is six wet cotton balls. Bars with different letters are statistically significant (P<0.05, LSD test).

Attractive activity of small hive beetle lures, described above in Example 5, in combination with Trap 10 of the present invention, was tested at a beeyard in Gainesville, Fla. in July and August. Trap captures were compared for three different lures. Trap A contained the lure prepared as in Example 1 above. About 50 grams of the moistened lure was placed in means for holding beetles 28 of device 10. Trap B contains about 9 grams of the moistened lure of Example 5 and Trap C contained six wet cotton balls which provided moisture to the trap. The number of beetles trapped every week during the experimental period was recorded and the lure was replaced weekly. Trap captures of the baited and control traps were pooled every week to compute for the percentage of beetles captured (p). The data were transformed to arcsin $\sqrt{p}$, before differences among means were tested for significance by ANOVA with SAS Version 8.0. Significantly more small hive beetles were captured from the hive baited with the lure inoculated with small hive beetle-yeast isolate (Example 5) than from the hive baited with the lure prepared from feeding beetles (Example 1). The control trap was significantly less effective than either of the other treatments in trapping small hive beetles. Results are shown in FIG. 12.

The foregoing detailed description is for the purpose of illustration. Such detail is solely for that purpose and those skilled in the art can make variations therein without departing from the spirit and scope of the invention.

INDEX OF THE ELEMENTS

10. Trap
21. Side Wall
22. Frame
23. Front Wall
24. Top
25. Center Opening
25*a*. Mesh Screen
26. Trap Plate
26*a*. Trap Plate Bottom
27. Trap Plate Opening
28. Trapping Means
29. Means for Removably Supporting Tray Plate
30. Entry Means
31. Rubber Gasket
32. Removable Top
33. Removable Top Opening

What is claimed:

1. An insect trap for a beehive comprising:
    a frame having three walls and a top surface wherein an interior of two of said walls includes means for supporting a trap plate, a trap plate operatively and removably connected to said frame walls, at least one entry means operatively connected to a beehive and said trap plate, and a trapping means operatively connected to said entry means.

2. The trap of claim 1 wherein said top surface of said frame has an opening covered with a mesh screen of a size to allow small insects to drop through towards said entry means and to exclude honeybees from exiting hive through said screen.

3. The trap of claim 2 wherein said trap plate has an opening which is operatively connected to said entry means and said opening in the top surface of said frame.

4. The trap of claim 1 wherein said at least one entry means includes a plurality of graduated tunnel-shaped entries having two openings at either end wherein one is a proximal opening which is larger than a distal opening.

5. The entries of claim 4 wherein said proximal opening is of a size to allow an insect the size of a small hive beetle or its larva to crawl in and the distal opening is of a size to prevent an insect the size of a small hive beetle or its larva to crawl back out of said trapping means.

6. The trap of claim 1 wherein said trapping means includes a removable top which is attached to said trap plate using a rubber gasket.

7. The trap of claim 6 wherein said trapping means is opaque to provide a dark environment wherein said dark environment is attractive to said insects.

8. The trap of claim 6 wherein said trapping means includes an attractant.

9. The trap of claim 8 wherein said attractant comprises pollen dough inoculated with yeast which produces small hive beetle attracting volatiles.

10. The trap of claim 9 wherein said yeast is Yeast strain NRRL Y-30722.

11. A method for trapping small hive beetles comprising:
  a. replacing the bottom board of a beehive with a trap wherein said trap includes a frame having three walls and a top surface wherein an interior of two of said walls includes means for supporting a trap plate, a trap plate operatively and removably connected to said frame walls, at least one entry means operatively connected to a beehive and said trap plate, and a trapping means operatively connected to said entry means, and
  b. placing an attractant in said trapping means.

12. The method of claim 11 wherein said top surface of said trap has an opening covered with a mesh screen of a size to allow small insects to drop through towards said entry means and to exclude honeybees from exiting the hive through said screen.

13. The method of claim 12 wherein said trap plate of said trap has an opening operatively connected to said entry means and said opening on the top surface of said frame.

14. The method of claim 11 wherein said at least one entry means includes a plurality of graduated tunnel-shaped entries having two openings at either end wherein one is a proximal opening of a larger size than a distal opening.

15. The method of claim 14 wherein said proximal openings are of a size to allow an insect the size of a small hive beetle or its larva to crawl in and the distal opening is of a size to prevent an insect the size of a small hive beetle or its larva from exiting said trapping means.

16. The method of claim 11 wherein said trapping means includes a removable top which is attached to said trap plate using a rubber gasket.

17. The method of claim 16 wherein said trapping means is opaque to provide a dark environment wherein said dark environment is attractive to said insects.

18. The method of claim 16 wherein said trapping means includes an attractant.

19. The method of claim 18 wherein said attractant comprises pollen dough inoculated with yeast which produces small hive beetle attracting volatiles.

20. The method of claim 19 wherein said yeast is yeast strain NRRL Y-30722.

* * * * *